(12) United States Patent
Zhang (10) Patent No.: US 7,499,250 B2
(45) Date of Patent: Mar. 3, 2009

(54) SYSTEMS, DEVICES, AND METHODS FOR TEMPERATURE COMPENSATION IN ARC FAULT DETECTION SYSTEMS

(75) Inventor: Bin Zhang, Alpharetta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 393 days.

(21) Appl. No.: 11/379,319

(22) Filed: Apr. 19, 2006

(65) Prior Publication Data

US 2007/0247767 A1 Oct. 25, 2007

(51) Int. Cl.
*H02H 3/16* (2006.01)
(52) U.S. Cl. .......................... 361/42; 361/44
(58) Field of Classification Search ............. 361/42–50; 700/292, 293
See application file for complete search history.

(56) References Cited

U.S. PATENT DOCUMENTS

| | | |
|---|---|---|
| 5,420,740 A | 5/1995 | MacKenzie |
| 5,483,211 A | 1/1996 | Carrodus |
| 5,510,945 A | 4/1996 | Taylor |
| 5,805,397 A | 9/1998 | MacKenzie |
| 5,818,237 A | 10/1998 | Zuercher |
| 5,835,321 A | 11/1998 | Elms |
| 5,896,262 A | 4/1999 | Rae |
| 5,929,145 A | 7/1999 | Higgins |
| 5,933,305 A | 8/1999 | Schmalz |
| 5,940,256 A | 8/1999 | MacKenzie |
| 5,963,405 A | 10/1999 | Engel |
| 5,963,406 A | 10/1999 | Neiger |
| 5,969,920 A | 10/1999 | MacKenzie |
| 5,999,384 A | 12/1999 | Chen |
| 6,031,699 A | 2/2000 | Dollar, II |
| 6,052,046 A | 4/2000 | Ennis |
| 6,088,205 A | 7/2000 | Neiger |
| 6,128,169 A | 10/2000 | Neiger |
| 6,191,589 B1 | 2/2001 | Clunn |
| 6,218,844 B1 | 4/2001 | Wong |
| 6,259,340 B1 | 7/2001 | Fuhr |
| 6,262,871 B1 | 7/2001 | Nemir |
| 6,266,219 B1 | 7/2001 | Macbeth |
| 6,339,525 B1 | 1/2002 | Neiger |
| 6,362,628 B2 | 3/2002 | Macbeth |
| 6,370,001 B1 | 4/2002 | Macbeth |
| 6,377,427 B1 | 4/2002 | Haun |
| 6,407,893 B1 | 6/2002 | Neiger |
| 6,414,829 B1 | 7/2002 | Haun |
| 6,417,671 B1 | 7/2002 | Haun |
| 6,421,214 B1 | 7/2002 | Packard |
| 6,426,632 B1 | 7/2002 | Clunn |
| 6,426,634 B1 | 7/2002 | Clunn |
| 6,433,978 B1 | 8/2002 | Neiger |
| 6,456,471 B1 | 9/2002 | Haun |
| 6,459,273 B1 | 10/2002 | Dollar, II |
| 6,466,029 B2 | 10/2002 | Stroth |
| 6,477,021 B1 | 11/2002 | Haun |
| 6,487,057 B1 | 11/2002 | Natili |
| 6,504,692 B1 | 1/2003 | Macbeth |
| 6,522,510 B1 | 2/2003 | Finlay |
| 6,525,918 B1 | 2/2003 | Alles |

(Continued)

*Primary Examiner*—Danny Nguyen (57) ABSTRACT

Certain exemplary embodiments comprise a method, which can comprise configuring a system to compare an electrical value and a selected pre-stored threshold value of a plurality of pre-stored threshold values. The method can comprise configuring the system to modify the plurality of pre-stored threshold values based upon a predetermined change in measured temperature.

21 Claims, 9 Drawing Sheets

U.S. PATENT DOCUMENTS

| | | | |
|---|---|---|---|
| 6,532,139 B2 | 3/2003 | Kim | |
| 6,532,424 B1 | 3/2003 | Haun | |
| 6,542,056 B2 | 4/2003 | Nerstrom | |
| 6,556,397 B2 | 4/2003 | Kim | |
| 6,567,250 B1 | 5/2003 | Haun | |
| 6,577,478 B2 | 6/2003 | Kim | |
| 6,577,484 B1 | 6/2003 | Macbeth | |
| 6,590,754 B1 | 7/2003 | Macbeth | |
| 6,608,741 B1 | 8/2003 | Macbeth | |
| 6,621,388 B1 | 9/2003 | Macbeth | |
| 6,621,669 B1 | 9/2003 | Haun | |
| 6,625,550 B1 | 9/2003 | Scott | |
| 6,628,486 B1 | 9/2003 | Macbeth | |
| 6,628,487 B1 | 9/2003 | Macbeth | |
| 6,633,467 B2 | 10/2003 | Macbeth | |
| 6,633,824 B2 | 10/2003 | Dollar, II | |
| 6,639,768 B2 | 10/2003 | Zuercher | |
| 6,639,769 B2 | 10/2003 | Neiger | |
| 6,654,219 B1 | 11/2003 | Romano | |
| 6,671,150 B2 | 12/2003 | Elms | |
| 6,678,137 B1 | 1/2004 | Mason, Jr. | |
| 6,707,651 B2 | 3/2004 | Elms | |
| 6,731,483 B2 | 5/2004 | Mason, Jr. | |
| 6,734,682 B2 | 5/2004 | Tallman | |
| 6,791,315 B2 * | 9/2004 | Skerritt et al. | 324/126 |
| 6,813,131 B2 | 11/2004 | Schmalz | |
| 6,856,498 B1 | 2/2005 | Finlay, Sr. | |
| 7,221,142 B2 * | 5/2007 | Murray et al. | 324/117 R |
| 7,254,004 B2 * | 8/2007 | Mladenik et al. | 361/93.1 |
| 7,319,574 B2 * | 1/2008 | Engel | 361/50 |
| 2003/0043522 A1 | 3/2003 | Schmalz | |
| 2005/0123408 A1 * | 6/2005 | Koehl | 417/53 |

* cited by examiner

Fig. 9

SYSTEMS, DEVICES, AND METHODS FOR TEMPERATURE COMPENSATION IN ARC FAULT DETECTION SYSTEMS

BACKGROUND

U.S. Pat. No. 6,678,137 (Mason), which is incorporated by reference herein in its entirety, allegedly recites an "arc fault current interrupting (AFCI) circuit breaker includes a pair of electrical contacts for stopping the flow of electrical current in a protected portion of the distribution circuit. A low pass filter is configured to receive a signal indicative of a voltage across a resistance in the distribution circuit. The low pass filter amplifies the signal and provides the signal to an arc fault detection circuit. The low pass filter includes an input resistance and a feedback resistance. In one embodiment of the invention, the input resistance has a positive temperature coefficient. In another embodiment, the feedback resistance has a negative temperature coefficient. In yet another embodiment, the input resistance has a positive temperature coefficient and the feedback resistance has a negative temperature coefficient. In any of the embodiments, when temperature decreases, the gain provided by the temperature compensation circuit increases due to the temperature coefficients of the input and/or feedback resistors. As a result, the arc fault detection circuitry will maintain a constant sensitivity to arc faults throughout the entire operating temperature range of the AFCI circuit breaker." See Abstract.

U.S. Pat. No. 6,813,131 (Schmalz), which is incorporated by reference herein in its entirety, allegedly recites a "circuit breaker includes separable contacts, a latchable operating mechanism having a latch member, a bimetal and an arc fault trip assembly. The trip assembly includes a thermistor responsive to bimetal temperature, an amplifier having first and second inputs and an output, a first resistor electrically connected between a second bimetal terminal and the first amplifier input, a second resistor electrically connected in parallel with the thermistor, a third resistor electrically connected in series with that parallel combination, with that series combination being electrically connected between the first amplifier input and the amplifier output. The second amplifier input is referenced to the first bimetal terminal. The amplifier output has a voltage, which is compensated for the bimetal temperature coefficient. The trip assembly provides a trip signal as a function of compensated voltage. A solenoid responds to the trip signal and releases the latch member to trip the separable contacts open." See Abstract.

U.S. Pat. No. 5,729,145 (Blades), which is incorporated by reference herein in its entirety, allegedly recites that "[a] rcing in an AC power system is detected by monitoring the power waveform for wideband high-frequency noise, and examining the detected noise for patterns of variation in its amplitude synchronized to the power waveform. A narrowband, swept-frequency detector and synchronous averaging may be employed to improve discrimination of arc noise from background interference. An arcing fault interrupter for controlling a single circuit, and a whole house monitor, for detecting arcing anywhere in a house, are described." See Abstract.

SUMMARY

Certain exemplary embodiments comprise a method, which can comprise configuring a system to compare an electrical value and a selected pre-stored threshold value of a plurality of pre-stored threshold values. The method can comprise configuring the system to modify the plurality of pre-stored threshold values based upon a predetermined change in measured temperature.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

adapted to—made suitable or fit for a specific use or situation.

allow—to provide.

analog—a signal formed from continuous measurement and/or input.

analog to digital conversion—to receive an analog input and generate a digital output related to the analog input.

and/or—either in conjunction with or in alternative to.

apparatus—an appliance or device for a particular purpose.

approximately—nearly the same as.

arc fault—a discharge of electricity between two or more conductors, the discharge associated with at least a predetermined voltage, current, and/or power level.

associated with—related to.

automatically—acting or operating in a manner essentially independent of external influence or control. For example, an automatic light switch can turn on upon "seeing" a person in its view, without the person manually operating the light switch.

backbone network—a "transit" network often made up of long-distance telephone trunk lines and/or other wired and/or wireless links such as microwave and satellite links for use in transmitting large amounts of data simultaneously between host computer systems connected to the Internet. Normal communicated data typically neither originates nor terminates in a backbone network.

based upon—consider in making a determination.

can—is capable of, in at least some embodiments.

change—a transformation or transition from one state, condition, or phase to another.

compare—to examine in order to note similarities or differences in relation to something else.

comprising—including but not limited to.

configure—to set up to perform a particular function.

configured to—capable of performing a particular function.

controlled temperature environment—a location wherein a thermal profile is maintained within a predetermined range.

correct—to change to a more desired value.

count—(n.) a number reached by counting.

count—(v.) to increment, typically by one and beginning at zero.

current transformer—a device electrically and/or magnetically couplable to a electric circuit, the device adapted to output a secondary electrical current in response to the electrical current (the "primary current") in the electric circuit, the secondary current typically a predetermined ratio of the primary current.

data—distinct pieces of information, usually formatted in a special or predetermined way and/or organized to express concepts.

define—to establish the outline, form, or structure of.

delay time—a time it takes for a circuit breaker to open after a trip condition of the circuit breaker is detected.

detect—to sense, perceive, and/or identify.

determine—to ascertain, obtain, and/or calculate.

device—a machine, manufacture, and/or collection thereof.

digital—non-analog; discrete.

electrical—pertaining to electricity.

energy—usable power.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

lower—smaller in magnitude.

machine instructions—directions adapted to cause a machine, such as an information device, to perform a particular operation or function. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

machine-readable—capable of being discerned by an information device.

manage—to direct or control.

may—is allowed and/or permitted to, in at least some embodiments.

measure—to ascertain a quantity by comparison with a standard.

measurement—a dimension, quantification, and/or capacity, etc. determined by observation.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

microprocessor—an integrated circuit that comprises a central processing unit.

modify—to cause to change.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

obtain—to receive, calculate, determine, and/or compute.

on-chip—a device or system resident on an integrated circuit.

packet—a discrete instance of communication.

pin—an electrically conductive appendage of a microprocessor.

plurality—the state of being plural and/or more than one.

possible—capable of happening or existing.

predetermined—established in advance.

pre-stored—determined in advance and retained in a memory device.

prevent—to keep an event from happening.

process—to perform mathematical and/or logical operations according to programmed instructions in order to obtain desired information.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish and/or supply.

range—a measure of an extent of a set of values.

rate—an amount of change occurring during a predetermined time period.

related—connected to and/or associated with.

relative—in comparison with.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

resistive—associated with a voltage drop across a resistor.

Rogowski coil—an electrical device for measuring an amplitude of an alternating current (AC). It typically comprises a helical coil of wire with the lead from one end returning through the center of the coil to the other end, so that both terminals are at the same end of the coil. A straight conductor is then inserted through the whole assembly, so that the longitudinal axis of the conductor and the winding axis of the coil are approximately co-axial. A change of current in the straight conductor then induces a proportional voltage in the coil. One potential advantage of a Rogowski coil over other types of induction coils is that it can be made open-ended and flexible, thereby potentially allowing it to be wrapped around a live conductor without disturbing it. Since a Rogowski coil typically has an air core rather than an iron core, it can have a low inductance and can respond to fast-changing currents. Also, because it typically has no iron core to saturate, its response typically is highly linear even when subjected to large currents, such as those used in electric power transmission and welding. A correctly formed Rogowski coil, with equally spaced windings, is typically immune to electromagnetic interference.

sample—(n.) a set of elements drawn from and analyzed to estimate the characteristics of a population; verb: to take a sample of.

sample—(v.) to obtain one or more measurements at random and/or predetermined times.

select—to choose.

self-heating—capable of achieving an increased level of temperature without an application of external heat.

sense—to detect or perceive automatically.

sensor—a device or system adapted to detect or perceive automatically.

set—a collection of distinct elements having specific common properties.

signal—detectable transmitted energy, such as an impulse or a fluctuating electric quantity, such as voltage, current, or electric field strength.

store—to place, hold, and/or retain data, typically in a memory.

substantially—to a great extent or degree.

system—a collection of mechanisms, devices, data, and/or instructions, the collection designed to perform one or more specific functions.

temperature—measure of the average kinetic energy of the molecules in a sample of matter, expressed in terms of units or degrees designated on a standard scale.

temperature caused variation—a change in a value related to and/or caused by a change in temperature.

threshold—a point that when exceeded produces a given effect or result.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—an assigned or calculated numerical quantity.

via—by way of and/or utilizing.

voltage—a difference in electrical potential between any two conductors of an electrical circuit.

waveform—a profile, graph, and/or visual model of variations of a signal's voltage and/or current over time.

DETAILED DESCRIPTION

Certain exemplary embodiments comprise a method, which can comprise configuring a system to compare an electrical value and a selected pre-stored threshold value of a plurality of pre-stored threshold values. The method can comprise configuring the system to modify the plurality of pre-stored threshold values based upon a predetermined change in measured temperature.

Certain exemplary embodiments comprise systems, devices and methods for calibrating and/or compensating for temperature caused variation in measurements of sensing elements in an arc fault detection system and/or a ground fault detection system.

Electrical energy transmitted in alternating current (AC) systems can be associated with a voltage waveform and a current waveform. Arc faults can occur in AC systems. Arc faults change the voltage waveform and the current waveform. The presence of an arc fault can be detected by comparing one or more sensed points on the voltage waveform and/or the current waveform to a predetermined threshold value.

Possible sensing components utilized in determining the sensed points comprise a resistive sensor, current transformer, and/or Rogowski coil, etc. Sensed values from a sensing component can be dependent upon temperature. Thus, arc fault detection accuracy can be improved by correcting sensed values for temperature. Temperature correction utilizing temperature values sampled at a rate approximating that of sampling the voltage waveform and/or the current waveform can impact arc fault determination speed and/or efficiency in certain information devices.

Certain exemplary embodiments can pre-measure, pre-calculate, and/or pre-store a plurality of threshold value corrections associated with a plurality of arc fault detection threshold values. When present in an electrical system, an arc fault can cause heating of electrical components present in the electrical system. An amount of heat generated by the arc fault can be related to a magnitude of an electrical current associated with the arc fault. Arc fault signal characterized by a higher current can generate a higher amount of heat in an electrical circuit than those characterized by a lower current. Accordingly, it might be desirable to trip a protective device in an electrical circuit more quickly for detected arc faults associated with a relatively high electrical current magnitude than for detected arc faults associated with a relatively low electrical current magnitude. Thus, the plurality of threshold values can each be associated with a predetermined electrical current range. Each predetermined electrical current range can be associated with a frequency range below which the electrical current might be filtered. A decision to trip the protective device in the electrical circuit can be dependent upon a predetermined time and/or number of waveform cycles the electrical circuit can operate safely with an arc fault characterized by a current of a given magnitude. In certain exemplary embodiments, each predetermined electrical current range and/or each of the plurality of arc fault detection threshold values can be determined empirically.

Each set of a plurality of sets of pluralities of threshold value corrections can be associated with a particular sensed temperature range. Based upon a sensed temperature and an associated stored threshold value correction, an actual temperature can be determined and/or a corrected voltage and/or current threshold associated with an arc fault can be calculated and/or stored. Sensed voltage and/or current values from the voltage and/or current sensing component can be compared to the corrected voltage and/or current threshold to determine the presence of an arc fault and/or trip the electrical circuit responsive to the arc fault.

Certain exemplary embodiments can comprise a temperature calibration and/or compensation method for an arc fault circuit interrupter (AFCI) system. The arc fault determination system can comprise an information device, micro-processor, and/or application specific integrated circuit (ASIC) configured to detect arc faults in an electrical circuit. Certain exemplary embodiments can compensate for temperature caused variation associated with sensing components for more accurate arc fault detection results. Certain exemplary embodiments can improve performance of a high speed waveform sampling arc detection algorithm. Certain exemplary embodiments can improve temperature compensation results for both linear and non-linear sensing components.

Certain exemplary AFCI products can be configured to identify an arc fault if the arc fault occurs and also distinguish the arc fault from normal signals and noise signals generated by many different types of electrical products. To do so, a micro-processor or digital signal processing (DSP) based AFCI product can be adapted to utilize voltage and/or current sensors to input a waveform and make identification decisions based on exemplary calculation methods and/or algorithms based upon an analysis of the input waveform. Sensors for arc fault detection can comprise a resistive sensor, current transformer, and/or Rogowski coil, etc.

Figure 1:
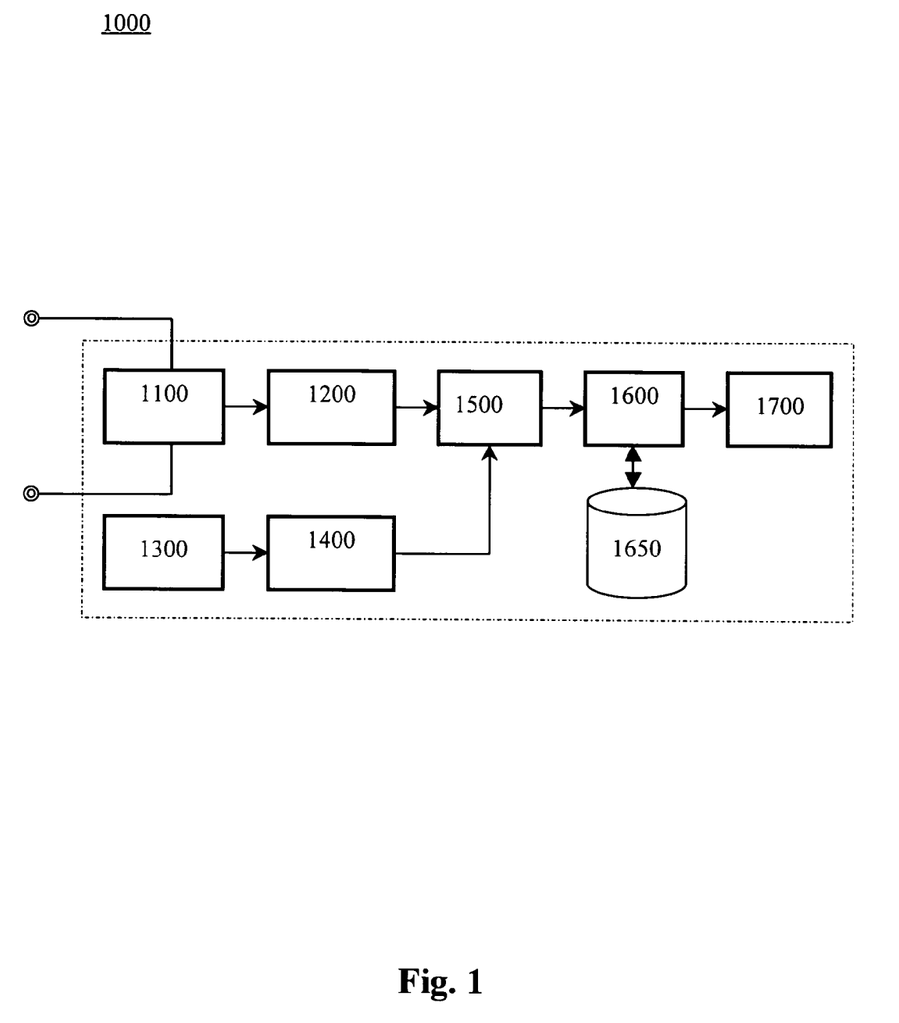
FIG. 1 is a block diagram of an exemplary embodiment of a system 1000.

FIG. 1 is a block diagram of an exemplary embodiment of a system 1000, which can comprise one or more electrical sensors 1100. Electrical sensors 1100 can be configured to measure and/or provide information regarding a voltage waveform and/or current waveform. Electrical sensor 1100 can be used, which can provide signals to a first signal conditioning amplifier 1200. System 1000 can comprise a temperature sensor 1300, which can provide a signal to an analog to digital (A/D) converter 1500 via a second signal conditioning amplifier 1400. A/D converter 1500 can be configured to provide one or more inputs to an information device 1600. In certain exemplary embodiments, temperature sensor 1300, second signal conditioning amplifier 1400 and/or A/D converter 1500 can be comprised by information device 1600. Information device 1600 can be configured to provide a signal configured to provide instructions to a tripping control sub-system 1700. Tripping control sub-system 1700 can be configured for use with actuators and/or solenoids adapted to interrupt a flow of electrical current in a circuit responsive to a detected arc fault.

Information device 1600 can be configured to automatically compare an electrical value and a selected pre-stored threshold value of a plurality of pre-stored threshold values. The electrical value can be related to a measurement provided by electrical sensor 1100 associated with an arc fault detection system. Information device 1600 can be configured to modify the plurality of pre-stored threshold values based upon a predetermined change in measured temperature. The measured temperature can be sampled at a lower rate than a sampling rate of said electrical measurement. Information device 1600 can be communicatively coupled to a memory device 1650, which can be configured to store the plurality of pre-stored threshold values.

Memory device 1650 can be a machine readable medium. Memory device 1650 can comprise instructions for configuring a system to compare an electrical value and a selected pre-stored threshold value of a plurality of pre-stored threshold values. The electrical value can be related to a measurement provided by electrical sensor 1100 associated with an arc fault detection system. The instructions can be for configuring the system to modify the plurality of pre-stored threshold values based upon a predetermined change in measured temperature. The system can be adapted to sample the measured temperature at a lower rate than a sampling rate of the electrical measurement.

In certain exemplary embodiments, information device 1600 can receive a signal embodied in an electromagnetic wave. The signal can be adapted to cause information device 1600 to provide a first set of machine-readable instructions adapted to configure system 1000 to compare an electrical value and a selected pre-stored threshold value of a plurality of pre-stored threshold values. The electrical value can be related to a measurement provided by electrical sensor 1100 associated with an arc fault detection system. The signal can be adapted to cause information device 1600 to provide a second set of machine-readable instructions adapted to configure the system to modify the plurality of pre-stored threshold values based upon a predetermined change in measured temperature. System 1000 can be adapted to sample the measured temperature at a lower rate than a sampling rate of the electrical measurement.

Figure 2:
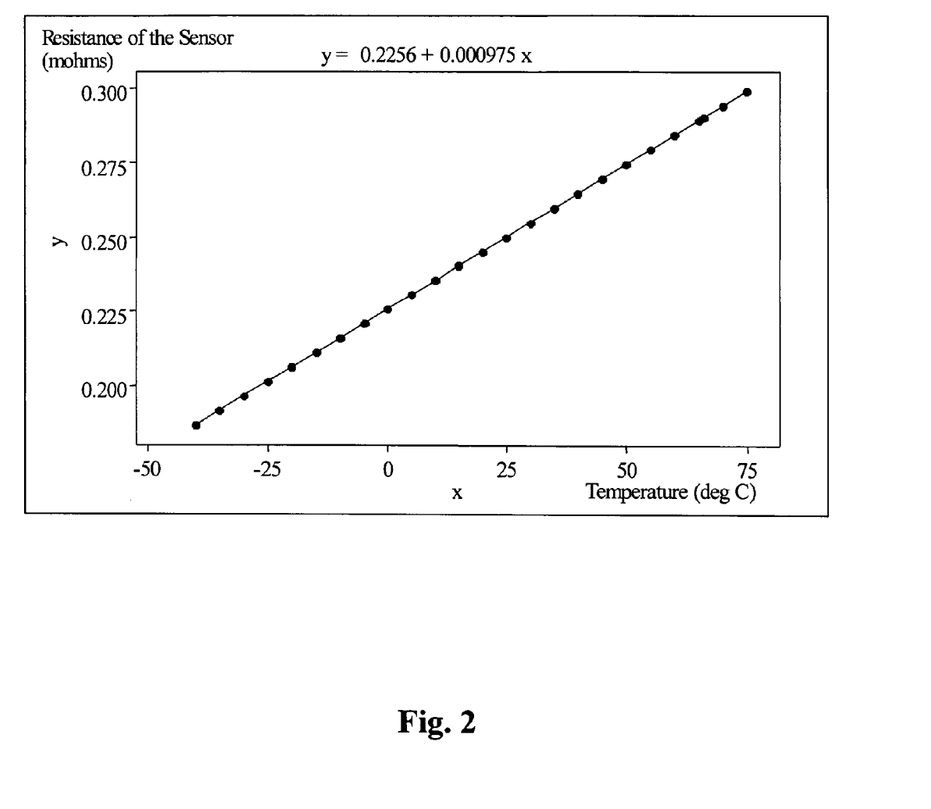
FIG. 2 is an exemplary graph of sensor resistance as a function of temperature.

FIG. 2 is an exemplary graph of sensor resistance as a function of temperature, which can comprise a curve indicative of how resistance in a particular sensor varies with temperature. Certain exemplary AFCI systems can comprise a shunt sensor. As illustrated in FIG. 2, a variation range of the strip shunt sensor can be as high as approximately ±25% for a temperature range between approximately −35 degrees Celsius and approximately 66 degrees Celsius. Variations of this magnitude might not be considered to be a negligible variation since arc fault detection results might be changed due to temperature changes.

Figure 3:
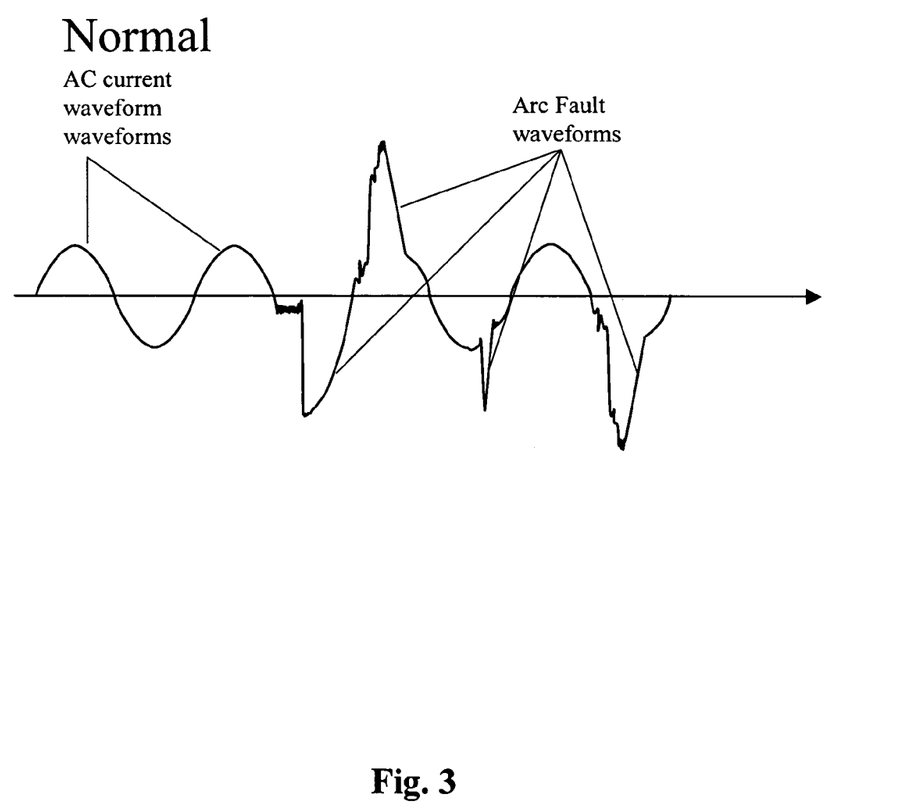
FIG. 3 is an exemplary embodiment of a waveform profile.

FIG. 3 is an exemplary embodiment of a waveform set 3000, which illustrates exemplary normal AC current, and arc fault waveforms. Exemplary waveforms can comprise many other noise signals as well that might have similar characteristics to an arc fault waveform. In order to distinguish arc fault waveforms via an information device, micro-processor, and/or DSP, a waveform can be sampled. The sampling information sent to the information device regarding the sampled waveform should be as close to a true representation of the waveform as possible. The sampling speed and the resolution of A/D converter and the speed of the information device can be important in arc fault detection. In certain exemplary embodiments, information device applications can capture special features of the waveform, such as a peak or a step change to identify if arcing is occurring or not. Since an AFCI can be configured to monitor a circuit in a real time mode, the information device can be configured to sample the waveform and execute arcing identification algorithm in between samples. When arcing is confirmed, the information device can send signal to trip a breaker. In certain exemplary embodiments, sampling speed and resolution of an A/D converter and a speed of a processor associated with the information device can be related to a cost of the AFCI. In certain exemplary embodiments, a sample speed of the A/D converter and the speed of the processor can be set to relatively high levels to accurately detect features of a waveform and can be configured to perform calculations in between samples. In certain exemplary embodiments, a speed of the information device might not be sufficient to allow a temperature compensation calculation at each point at which the waveform is sampled.

In certain exemplary embodiments, an arcing event can be identified and distinguished from other signals via recognition of a signal step change, amplitude or peak, and/or waveform pulse pattern during a predetermined time interval. The waveforms illustrated in FIG. 3 indicated that sampling rates can be important in identifying a step change on the waveform. The step change can be substantially independent from waveform's amplitude or peak. In certain exemplary embodiments, a signal transformation from a sensor to the information device can be a linear one. For linear signal transformations, errors generated from a sensor in the amplitude direction can be taken by the information device to be multiples of a constant. Predetermined threshold values can be used to process amplitude information received from sensor as part of evidence to judge if an arc fault is occurring.

Assume the predetermined threshold values are $$V=\{A_1, A_2, \ldots A_n\} \quad (1)$$

In certain exemplary embodiments, these threshold values can be fixed and temperature compensation can be performed at each sampling point. In such embodiments, the information device can obtain a temperature input from a temperature sensor at each sampling point. The information device can determine a current temperature, modify each sampled value from an electrical current sensor, and apply a corrected value to an arcing detection algorithm. In certain exemplary embodiments, temperature change can be a relatively slow process. Certain exemplary embodiments can take advantage of the relatively slow process by performing temperature checks and compensation at a lower frequency than a frequency at which the waveform might be sampled. The sampling frequency for an exemplary waveform can be between approximately 5 kHz and approximately 100 kHz. In certain exemplary embodiments, the temperature sampling rate can be relatively slower, such as in a range between approximately 0.01 kHz and 10 kHz. Because of linear characteristics of a signal acquisition system from a sensor to the information device, certain exemplary embodiments do not compensate for temperature caused variation at each sampling point. Instead, temperature can be sensed at a lower frequency than the frequency at which the waveform might be sampled. Corrections can be made regarding threshold values in an AFCI system responsive to temperature measurements taken at the lower frequency.

In certain exemplary embodiments, a relationship between temperature and resistance can be expressed as:

$$R = R_0 + \alpha \cdot T \tag{2}$$

Where, R is the resistance at temperature, T and $R_0$ are constant values at room temperature and $\alpha$ is a coefficient. Temperature calibration can compensate for a change of resistance with temperature for a shunt strap sensor.

$$\Delta R = \alpha \cdot \Delta T \tag{3}$$

Where $\Delta T$ represents a temperature change.
New threshold values can be expressed as:

$$V = \{A_1 + \Delta_1, A_2 + \Delta_2, \ldots, A_n + \Delta n\} \tag{4}$$

In equation (4), $$\Delta n = A_n \cdot \alpha \cdot \Delta T \cdot k \cdot \beta \tag{5}$$

Where $\beta$ is a constant related to a signal range and system resolution and $A_n$, $\alpha$, $\Delta T$, and k are also known values to a specific system related to signal range and resolution of an A/D converter.

Figure 4:
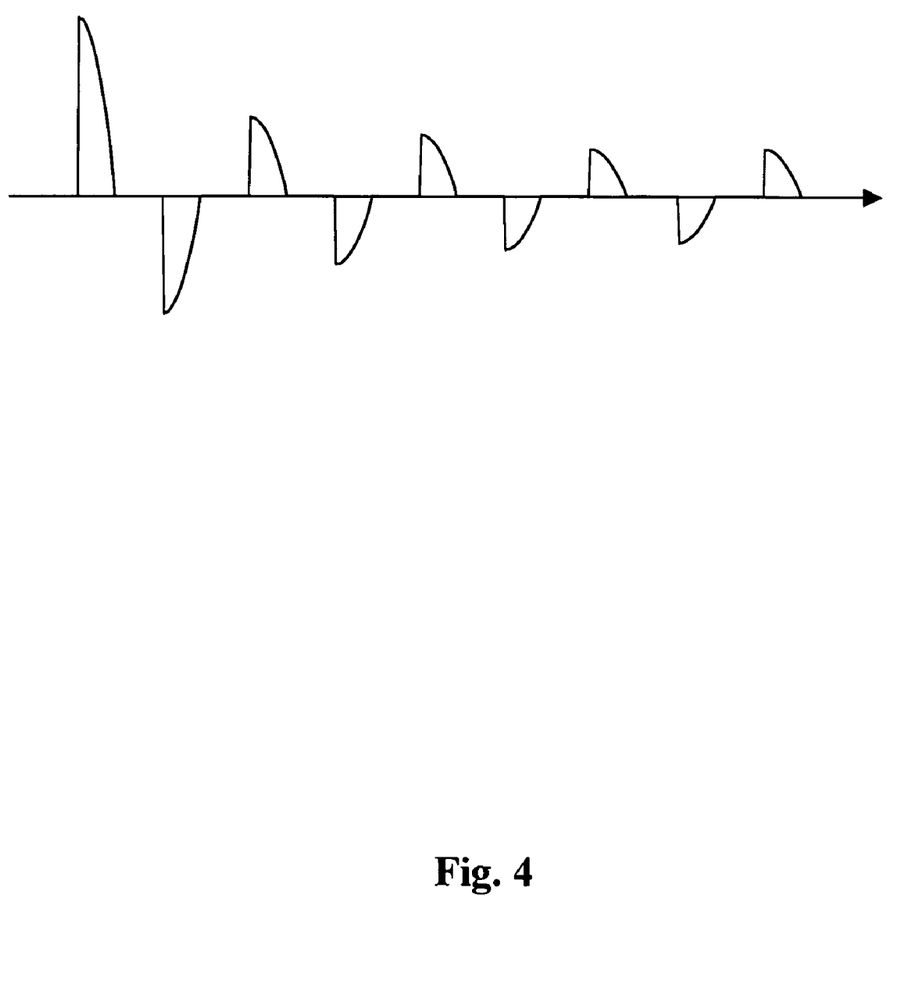
FIG. 4 is an exemplary embodiment of a waveform profile.

FIG. 4 is an exemplary embodiment of a waveform profile.

Figure 5:
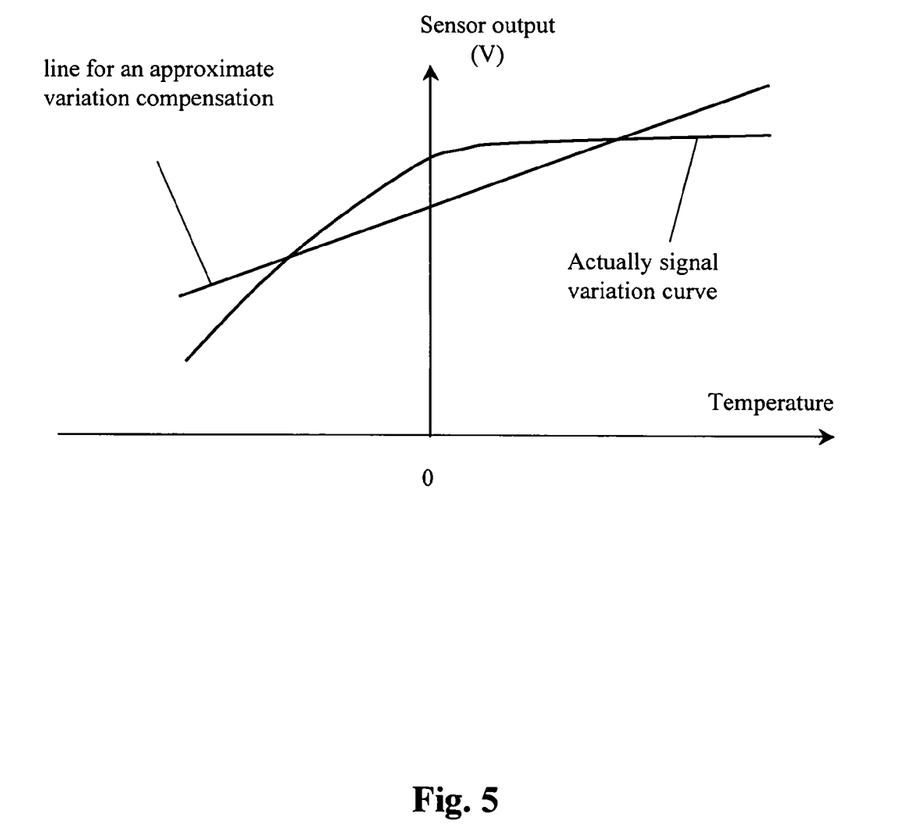
FIG. 5 is an exemplary graph of variation of a sensor output as a function of temperature.

FIG. 5 is an exemplary graph of variation of a sensor output as a function of temperature. Some sensing components can be characterized by a non-linear signal variation for a change in temperature, for example a current transformer.

Figure 6:
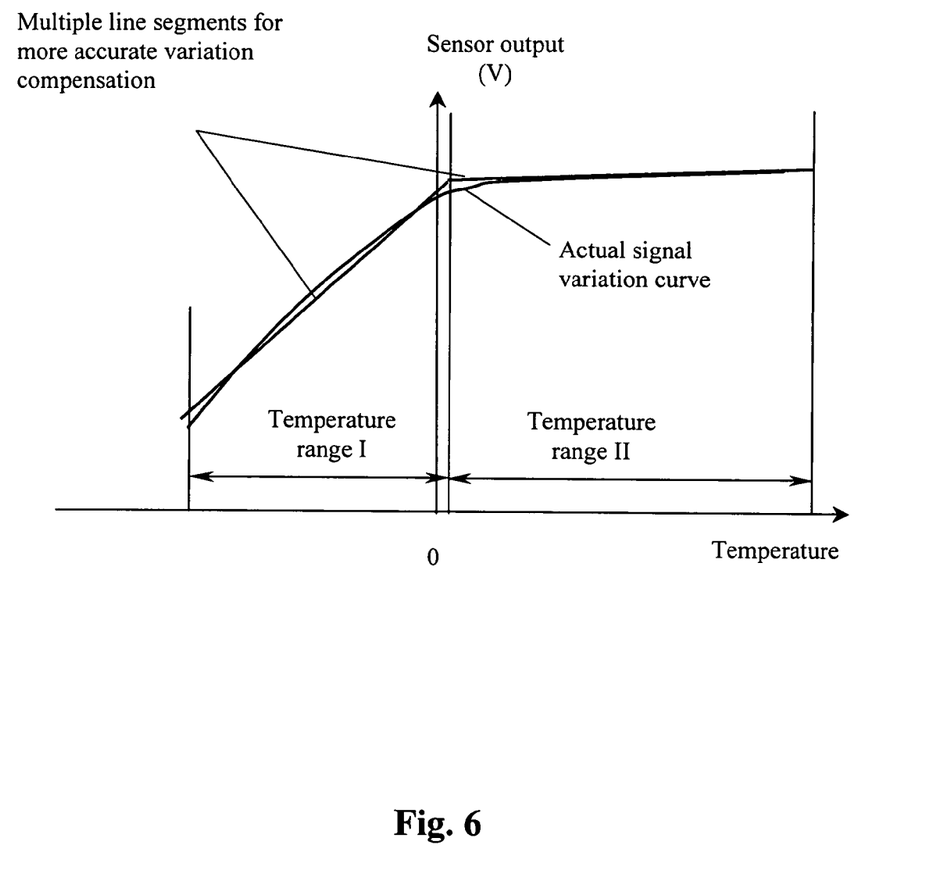
FIG. 6 is an exemplary graph of variation of a sensor output as a function of temperature.

FIG. 6 is an exemplary graph of variation of a sensor output as a function of temperature. In certain exemplary embodiments, defining a plurality of line segments to model a curve can result in better accuracy for temperature compensation as compared to modeling the curve with a single straight line. A line or multiple line segments can be used to approximate the accurate temperature variation. Sensors characterized by non-linear variation of output with temperature can be utilized in a ground fault circuit interrupt (GFCI) product. In certain exemplary embodiments, temperature compensation can be applied to a GFCI system.

Since a temperature sensor, which can be either on-chip or separate therefrom, can be characterized by a certain degree of variation because of manufacturing or material variations, a calibration can be performed to compensate for any such variations. A calibration method can comprise controlling an environmental temperature. For example, an assembled AFCI or GFCI product can be placed in an environment at a controlled temperature of approximately 25 degrees Celsius. The calibration method can comprise powering the assembled AFCI or GFCI product. The calibration method can comprise delaying for a predetermined time period (which can depend on characteristics of the sensing component) to allow for self-heating of the sensor.

The calibration method can comprise performing an analog to digital conversion with the temperature sensor selected as input. The analog to digital conversion can be controlled by a preprogrammed routine running in the information device and triggered by an input signal. The calibration method can comprise calculating offset and/or gain characteristics as a function of temperature and/or storing the offset and/or gain characteristics in a memory device. The calibration method can comprise, during a real temperature compensation process, utilizing stored offset and/or gain characteristics obtained from the memory device to calculate an actual temperature and/or compensate for variations in temperature.

Figure 7:
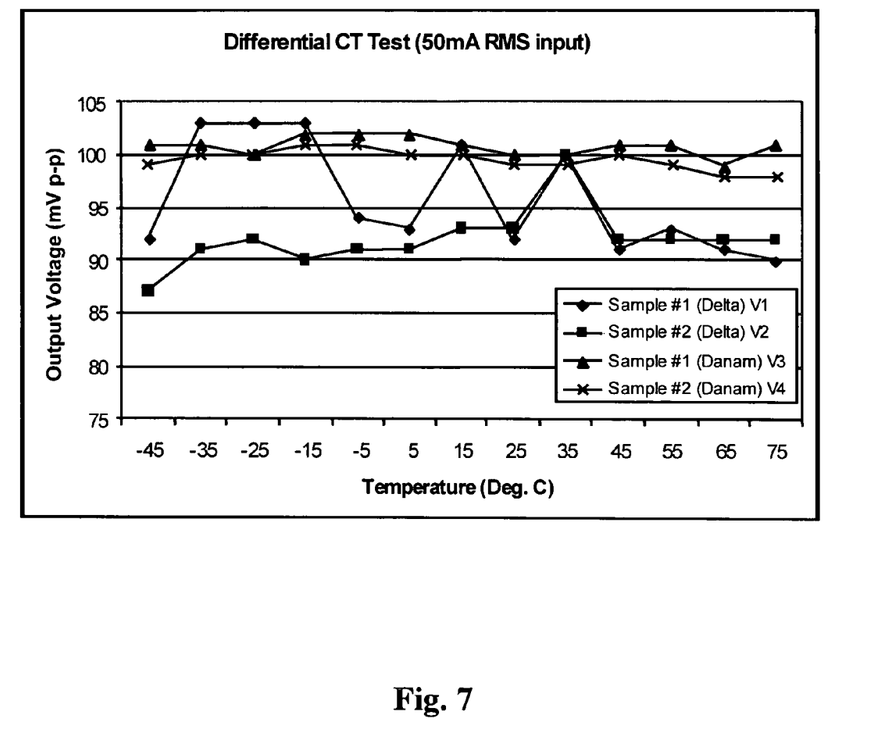
FIG. 7 is an exemplary graph of output voltage as a function of temperature.

FIG. 7 is an exemplary graph of output voltage as a function of temperature, which illustrates temperature testing results from different vendors for differential current transformer (CT) sensors. Exemplary differential CT sensors might have similar characteristics to Danam's (available from Danam Corporation of San Jose, Calif.). Therefore, temperature compensation for CT sensors might be similar for sensors provided by different manufacturers.

In certain exemplary embodiments, a calibration method can comprise utilizing a microprocessor pin as a switch input for temperature calibration. A default setting of this input can be high. Whenever an input to the microprocessor pin is low, the microprocessor can read the input of temperature sensor on chip three times, get an average, and save temperature information to a memory device as a reference value of room temperature ($T_0$). In certain exemplary embodiments, the calibration method can be executed during an assembly process at an ambient temperature, such as between approximately 20 degrees Celsius and approximately 30 degrees Celsius.

When the input to the microprocessor is high, the microprocessor can obtain a reading from the temperature sensor at predetermined time intervals. In certain exemplary embodiments, the time interval can be approximately 500 mS. The difference between the new temperature (T) and the ambient temperature can be used to adjust default current threshold values in an arc fault detection algorithm for a shunt sensor. An appropriate reference value can be saved into the memory device during a system start-up initialization.

Exemplary threshold values can be:

$$V = \{A40\text{Value}, A50\text{Value}, \ldots, A180\text{Value}\} \tag{6}$$

Since, $$\Delta R = \alpha \cdot \Delta T \tag{7}$$

New threshold values can be:

$$V = \{A40\text{Value} + \Delta_1, A50\text{Value} + \Delta_2, \ldots, A180\text{Value} + \Delta_n\} \tag{8}$$

In above equation, $$\Delta_n = A_n \cdot \alpha \cdot \Delta T \cdot k \cdot 256/3300 \tag{9}$$

Where $A_n = \{40, 50, \ldots 180\}$;
$\alpha$ is approximately 0.001; and
k is the gain of the hardware amplifier from the current shunt sensor to the microprocessor.

Threshold values in $A_n$ can be determined empirically. Listed are values are intended to be exemplary and not restrictive in application to other potential embodiments. In certain exemplary embodiments, a designed signal range for the shunt sensor can be between approximately 0 amps Root Mean Square (RMS) and approximately 250 amps RMS. The designed signal range can be associated with a voltage signal to the microprocessor A/D input port, which can be between approximately 1.65 volts and approximately 3.30 volts. Threshold values in the above equations can be expressed as RMS values. In certain exemplary embodiments, the microprocessor can update threshold values approximately every 500 milliseconds according to the above equations and temperature changes.

Figure 8:
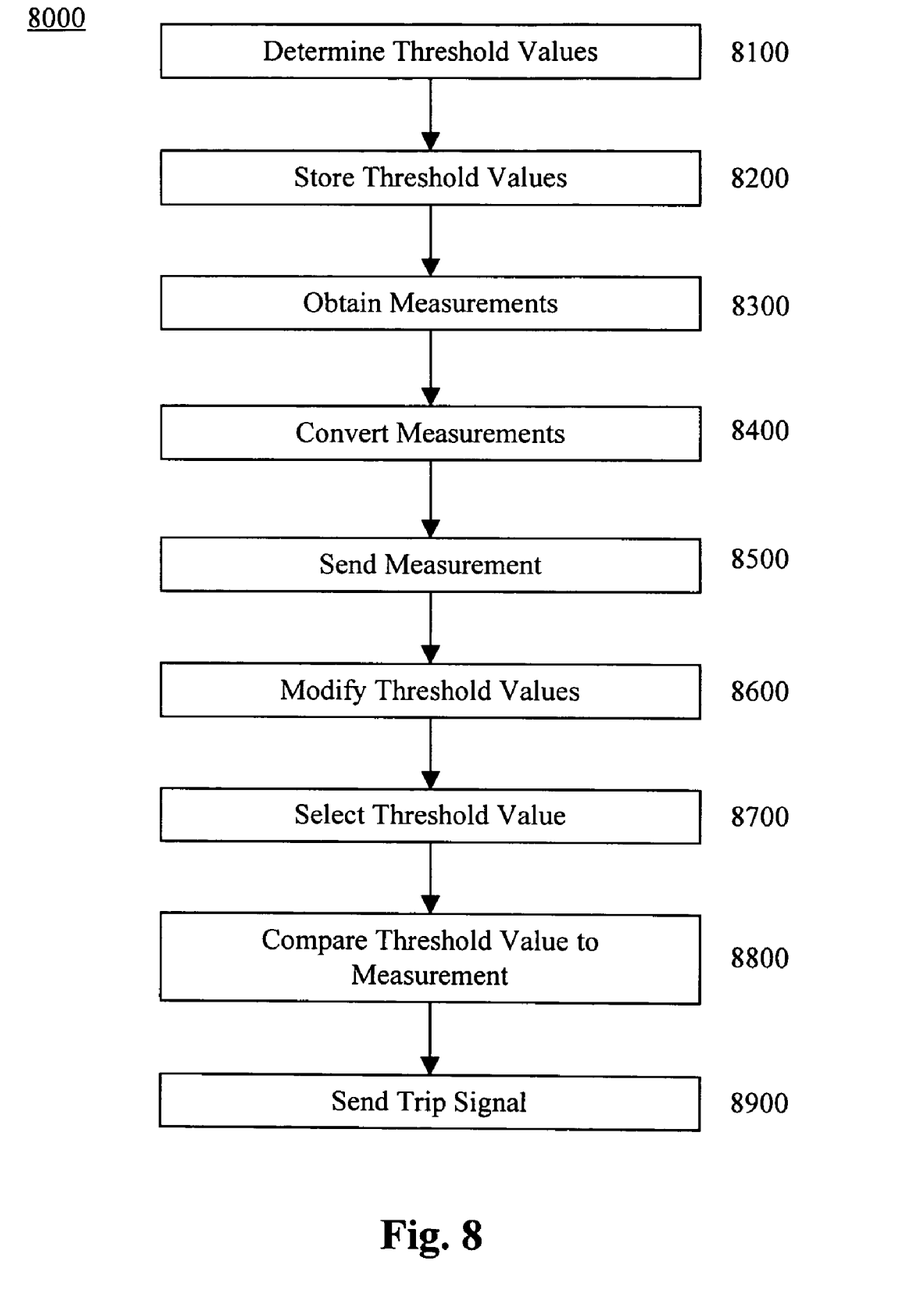
FIG. 8 is a flowchart of an exemplary embodiment of a method 8000.

FIG. 8 is a flowchart of an exemplary embodiment of a method 8000. At activity 8100, a system can be configured to determine a plurality of threshold values. In certain exemplary embodiments, the system can be configured to determine the plurality of pre-stored threshold values after a delay time to allow for self-heating of a sensor configured to measure an electrical value. The system can be configured to determine the plurality of pre-stored threshold values responsive to a sensed temperature. The sensed temperature can be processed via a method comprising an analog to digital conversion. For example, the sensed temperature can be processed via a method comprising an analog to digital conversion performed via an information device.

At activity 8200, the plurality of threshold values can be stored in a memory device.

At activity 8300, measurements can be obtained. The system can be configured to obtain the measurement provided by the sensor via a resistive sensor, a current transformer, and/or a Rogowski coil, etc. The system can be configured to filter the measurement via a high pass filter to obtain a derived signal of a desired frequency range. The system can be configured to sample a waveform to determine the electrical value, such as a magnitude of an electrical current and/or an electrical voltage. The system can be configured to obtain the measured temperature via an on-chip temperature sensor. The system can be configured to sample the temperature measurement at a lower rate than a sampling rate of the waveform. The lower rate can be based upon a microprocessor pin voltage.

At activity 8400, the measurements can be converted from an analog form to a digital form. For example, the system can be configured to convert the measured temperature from an analog signal to a digital signal within an information device and/or external to the information device.

At activity 8500, the system can be configured to send measurements such as the electrical value to the information device.

At activity 8600, one or more of the plurality of threshold values can be modified. The system can be configured to modify the plurality of pre-stored threshold values based upon a predetermined change in measured temperature.

At activity 8700, the system can be configured to select a pre-stored threshold value from the plurality of pre-stored threshold values based upon the measurement provided by the sensor and/or the measured temperature. The plurality of pre-stored threshold values can be a first plurality of pre-stored threshold values. The system can be adapted to store a second plurality of pre-stored threshold values selectable by the system. In certain exemplary embodiments, a signal can be provided, which can be adapted to configure the system to modify the plurality of pre-stored threshold values based upon a predetermined change in measured temperature.

At activity 8800, a selected threshold value can be compared to a current measurement. The system can be configured to compare an electrical value and a selected pre-stored threshold value of the plurality of pre-stored threshold values. The electrical value can be related to a measurement provided by a sensor associated with an arc fault detection system. In certain exemplary embodiments, an electromagnetic signal can be provided, which can be adapted to configure the system to compare the electrical value and the selected pre-stored threshold value of the plurality of pre-stored threshold values.

At activity 8900, a signal can be sent to a device configured to trip an electrical circuit breaker.

Figure 9:
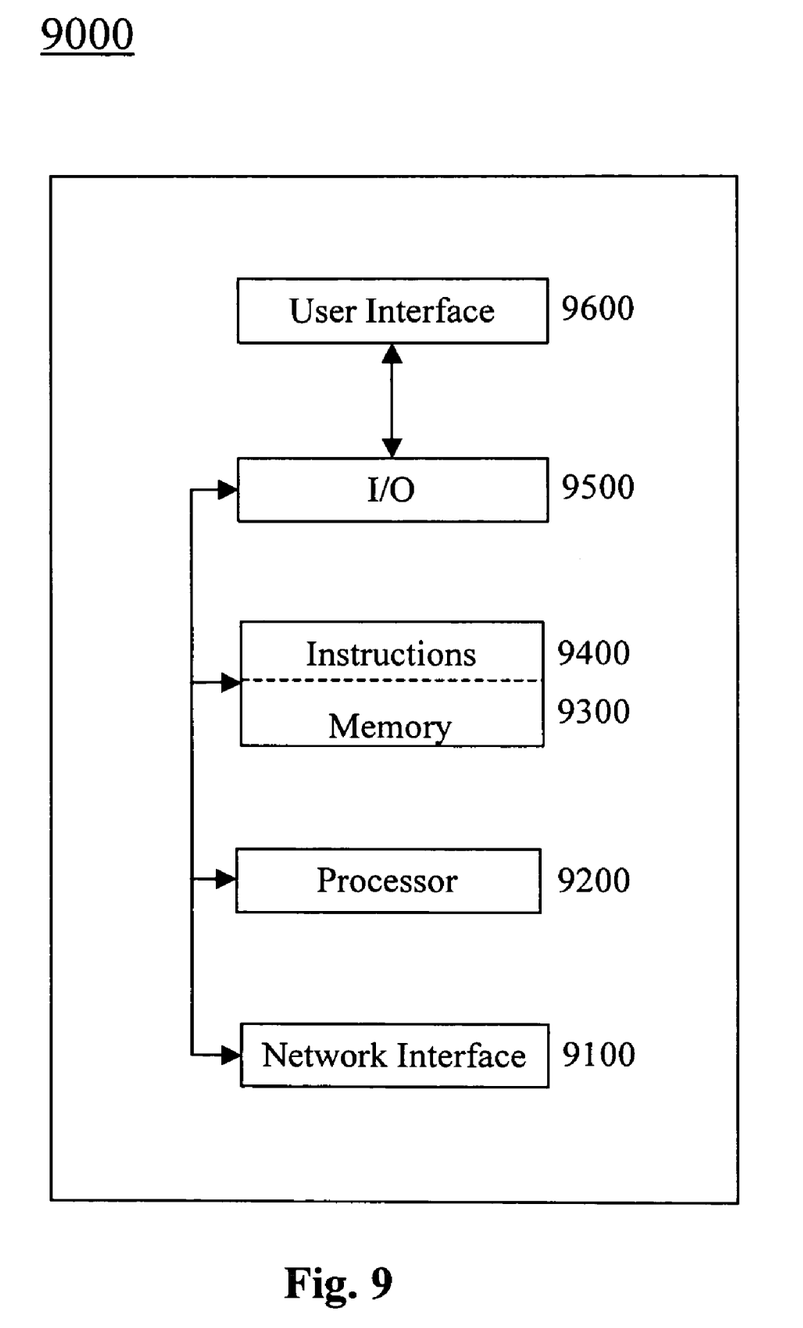
FIG. 9 is a block diagram of an exemplary embodiment of an information device 9000.

FIG. 9 is a block diagram of an exemplary embodiment of an information device 9000, which in certain operative embodiments can comprise, for example, information device 1600, of FIG. 1. Information device 9000 can comprise any of numerous components, such as for example, one or more network interfaces 9100, one or more processors 9200, one or more memories 9300 containing instructions 9400, one or more input/output (I/O) devices 9500, and/or one or more user interfaces 9600 coupled to I/O device 9500, etc.

In certain exemplary embodiments, via one or more user interfaces 9600, such as a graphical user interface, a user can view a rendering of information related to arc fault determination and/or temperature compensation in an arc fault detection system.

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method comprising:

configuring a system to compare an electrical value and a selected pre-stored threshold value of a plurality of pre-stored threshold values, said electrical value related to a measurement provided by a sensor associated with an arc fault detection system; and configuring said system to trip a protective device in an electrical circuit responsive to a detected arc fault, said arc fault detected based upon said plurality of pre-stored threshold values, said plurality of pre-stored threshold values automatically modified responsive to a predetermined change in measured temperature, said system adapted to sample said measured temperature at a lower rate than a sampling rate of said electrical measurement.

2. The method of claim 1, further comprising:
configuring said system to select said selected pre-stored threshold value from said plurality of pre-stored threshold values based upon said measurement provided by said sensor and said measured temperature.

3. The method of claim 1, further comprising:
configuring said system to obtain said measurement provided by said sensor via a resistive sensor.

4. The method of claim 1, further comprising:
configuring said system to obtain said measurement provided by said sensor via a current transformer.

5. The method of claim 1, further comprising:
configuring said system to obtain said measurement provided by said sensor via a Rogowski coil.

6. The method of claim 1, further comprising:
configuring said system to obtain said measured temperature via an on-chip temperature sensor.

7. The method of claim 1, further comprising:
configuring said system to convert said measured temperature from an analog signal to a digital signal.

8. The method of claim 1, further comprising:
configuring said system to sample a waveform to determine said electrical value.

9. The method of claim 1, further comprising:
configuring said system to send said electrical value to an information device.

10. The method of claim 1, further comprising:
configuring said system to determine said plurality of pre-stored threshold values.

11. The method of claim 1, further comprising:
configuring said system to determine said plurality of pre-stored threshold values after a delay time to allow for self-heating of said sensor.

12. The method of claim 1, further comprising:
configuring said system to determine said plurality of pre-stored threshold values responsive to a sensed temperature, said sensed temperature processed via a method comprising an analog to digital conversion.

13. The method of claim 1, further comprising:
configuring said system to determine said plurality of pre-stored threshold values responsive to a sensed temperature processed via a method comprising an analog to digital conversion performed via an information device.

14. The method of claim 1, further comprising:
configuring said system to sample said temperature measurement at said lower rate based upon a microprocessor pin voltage.

15. The method of claim 1, further comprising:
configuring said system to select said plurality of pre-stored threshold values based upon said measured temperature, wherein said plurality of pre-stored threshold values is a first plurality of pre-stored threshold values, said system adapted to store a second plurality of pry-stored threshold values selectable by said system.

16. A system comprising:
an information device configured to automatically compare an electrical value and a selected pre-stored threshold value of a plurality of pre-stored threshold values, said electrical value related to a measurement provided by a sensor associated with an arc fault detection system, said information device configured to trip a protective device in an electrical circuit responsive to a detected arc fault, said arc fault detected based upon said plurality of pre-stored threshold values, said plurality of pre-stored threshold values automatically modified responsive to a predetermined change in measured temperature, said measured temperature sampled at a lower rate than a sampling rate of said electrical measurement.

17. The system of claim 16, further comprising:
a memory device configured to store said plurality of pre-stored threshold values, said information device communicatively coupled to said memory device.

18. The system of claim 16, further comprising:
said sensor.

19. A machine readable medium comprising instructions for:
configuring a system to compare an electrical value and a selected pre-stored threshold value of a plurality of pre-stored threshold values, said electrical value related to a measurement provided by a sensor associated with an arc fault detection system; and
configuring said system to trip a protective device in an electrical circuit responsive to a detected arc fault, said arc fault detected based upon said plurality of pre-stored threshold values, said plurality of pre-stored threshold values automatically modified responsive to a predetermined change in measured temperature, said system adapted to sample said measured temperature at a lower rate than a sampling rate of said electrical measurement.

20. A method comprising:
providing a first electromagnetic signal adapted to configure a system to compare an electrical value and a selected pre-stored threshold value of a plurality of pre-stored threshold values, said electrical value related to a measurement provided by a sensor associated with an arc fault detection system; and
providing a second electromagnetic signal adapted to configure said system to trip a protective device in an electrical circuit responsive to a detected arc fault, said arc fault detected based upon said plurality of pre-stored threshold values, said plurality of pre-stored threshold values automatically modified responsive to a predetermined change in measured temperature, said system adapted to sample said measured temperature at a lower rate than a sampling rate of said electrical measurement.

21. An apparatus having
an information device configured to provide a first set of machine-readable instructions adapted to configure a system to compare an electrical value and a selected pre-stored threshold value of a plurality of pre-stored threshold values, said electrical value related m a measurement provided by a sensor associated with an arc fault detection system; and
provide a second set of machine-readable instructions adapted to configure said system to trip a protective device in an electrical circuit responsive to a detected arc fault, the arc fault detected based upon said plurality of pre-stored threshold value, said plurality of pre-stored threshold values automatically modified responsive to predetermined change in measured temperature, said system adapted to sample said measured temperature at a lower rate than a sampling rate of said electrical measurement.

* * * * *